United States Patent [19]

Volz et al.

[11] Patent Number: 5,460,436
[45] Date of Patent: Oct. 24, 1995

[54] SLIP-CONTROLLED BRAKE SYSTEM

[75] Inventors: Peter Volz, Damrstadt; Erhard Beck, Weilburg, both of Germany

[73] Assignee: ITT Automotive Europe GmbH, Germany

[21] Appl. No.: 284,681

[22] PCT Filed: Jan. 22, 1993

[86] PCT No.: PCT/EP93/00142

§ 371 Date: Aug. 9, 1994

§ 102(e) Date: Aug. 9, 1994

[87] PCT Pub. No.: WO93/15940

PCT Pub. Date: Aug. 19, 1993

[30] Foreign Application Priority Data

Feb. 11, 1992 [DE] Germany ............................ 42 03 878.2

[51] Int. Cl.$^6$ ................................. B60T 8/32; B60T 8/44
[52] U.S. Cl. ................. 303/113.2; 303/84.1; 303/87; 303/116.1; 303/117.1
[58] Field of Search ................. 303/113.1, 113.2, 303/113.3, 84.1, 84.2, 87, 900, 901, DIG. 1, DIG. 2, 6.01, 115.1, 115.4, 115.5, 116.1, 116.2, 117.1

[56] References Cited

U.S. PATENT DOCUMENTS

| 5,007,687 | 4/1991 | Kircher et al. | 303/900 |
|---|---|---|---|
| 5,094,511 | 3/1992 | Becker et al. | 303/116.1 |
| 5,098,173 | 3/1992 | Beck et al. | 303/116.1 |
| 5,129,714 | 7/1992 | Latarnik | 303/DIG. 1 |
| 5,188,433 | 2/1993 | Reinartz et al. | 303/116.1 |
| 5,251,971 | 10/1993 | Reinartz et al. | 303/900 |
| 5,312,174 | 5/1994 | Beilfuss et al. | 303/87 |

FOREIGN PATENT DOCUMENTS

| 3622556 | 1/1988 | Germany . |
|---|---|---|
| 3741235 | 6/1989 | Germany . |
| 3842699 | 6/1990 | Germany . |
| 3932531 | 4/1991 | Germany . |
| 4003328 | 8/1991 | Germany . |
| 4023708 | 1/1992 | Germany . |
| 4019347 | 1/1992 | Germany . |
| 4016748 | 9/1992 | Germany . |

*Primary Examiner*—Douglas C. Butler
*Attorney, Agent, or Firm*—Dykema Gossett

[57] ABSTRACT

A slip-controlled brake system for effectively attenuating switching noises at the inlet valves of slip control brake systems. This system is effective and simplifies current approaches. This is achieved in that for several wheel brakes the system uses one differential pressure limiter which is common to several wheel brakes which is mounted between an auxiliary pressure source and brake cylinder inlet valves. A reference pressure, which corresponds to one of the wheel brake pressures, is supplied to the differential pressure limiter by way of a pressure selector. The pressure selector can be designed such that it conveys either the highest or the lowest of the wheel brake pressures to the differential pressure limiter.

5 Claims, 3 Drawing Sheets

SLIP-CONTROLLED BRAKE SYSTEM

TECHNICAL FIELD

The present invention relates to brake systems and more particularly relates to slip-controlled hydraulic brake systems.

A brake system of this general type is known from DE-38 42 699 A1. To avoid loud switching noises at the inlet valves, the brake system described therein is furnished upstream of each inlet valve with a differential pressure limiter which, in each case, shuts off further pressure fluid supply to the inlet valves when the pressure upstream of the inlet valves exceeds the pressure in the wheel brakes by a predefined amount. This approach has proved efficient, since the switching noises were greatly diminished due to the limited pressure difference across the inlet valves. However, it has a disadvantage in that the installation of four differential pressure limiters render the brake system much more costly to produce and complex in design.

The object of the present invention is to provide a simpler arrangement for noise reduction without limiting the operational reliability of the brake system.

SUMMARY OF THE INVENTION

This object is achieved by providing one common differential pressure limiter for several wheel brakes. Since only one of the wheel braking pressures can act as a reference pressure in each case, a pressure selector is inserted between the control lines and the differential pressure limiter which, depending on the respective pressure conditions in the wheel brakes, selects one of the two wheel braking pressures which is to serve as a reference pressure.

When the pressure selector selects in each case the lowest of the wheel braking pressures, the switching noises are diminished compared to the selection of the highest of the wheel braking pressures. However, depending on the dimensioning of the brake system, it may occur that too little braking force is applied. Therefore, depending on the brake system, predetermined selection criterion is applied.

This type of noise reduction has proved effective especially in those brake systems in which a high-pressure accumulator is available which furnishes the wheel brakes with pressure fluid during traction slip control, since the pressure is applied abruptly at the inlet valves.

Yet, the present invention is also applicable on all other brake systems which are equipped with an auxiliary pressure source (e.g. with a pump).

Further advantageous features can be gathered from the description of a preferred embodiment of the inventive brake system of the present invention.

DETAILED DESCRIPTION OF THE PREFERRED EMBODIMENTS

Figure 1:
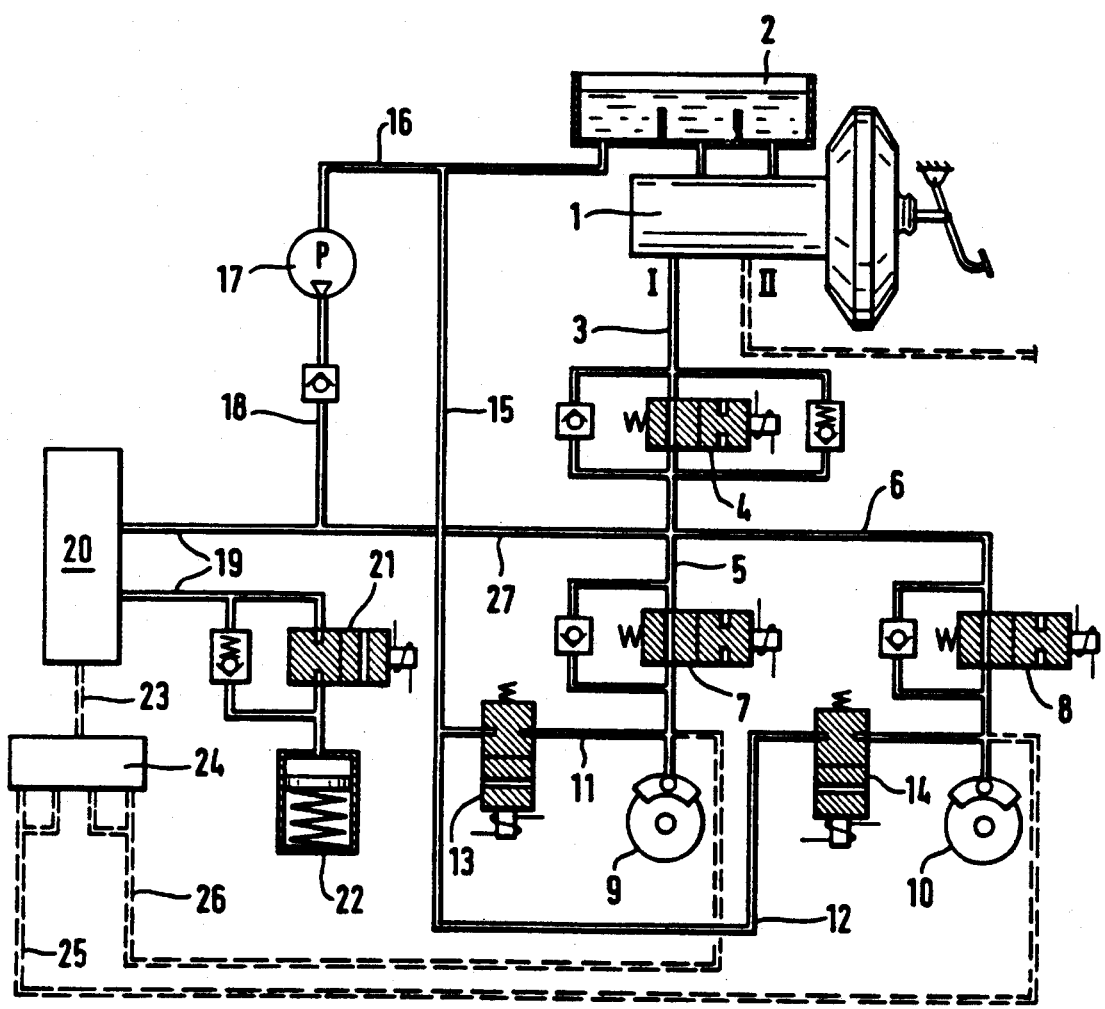
FIG. 1 is the inventive brake system of the present invention.

The brake system according to FIG. 1 comprises a master brake cylinder 1 which is in communication with the pressure fluid reservoir 2. The master brake cylinder 1 serves to furnish the brake circuits I and II with pressure fluid, only brake circuit I thereof being illustrated.

The brake line 3 leads from the master brake cylinder 1 by way of the shut-off valve 4 into two brake branch lines 5 and 6 which lead to the wheel brakes 9 and 10 by way of the inlet valves 7 and 8, respectively. Extending from the wheel brakes 9 and 10 is a return branch line 11 and 12, respectively. Lines 11 and 12 return fluid to pressure fluid reservoir 2 by way of common return line 15. Connected to the pressure fluid reservoir 2 is also the pump 17 by way of the suction line 16. The pump 17 supplies fluid into the pump line 18 which divides into the accumulator line 19 and the auxiliary-pressure line 27. The auxiliary-pressure line 27 ends into the brake line 3 between shut-off valve 4 and the inlet valves. The accumulator line 19' connects the differential pressure limiter 20 to the accumulator-charging valve 21. The pressure accumulator 22 is connected to accumulator-charging valve 21 by way of line 19".

Figure 2:
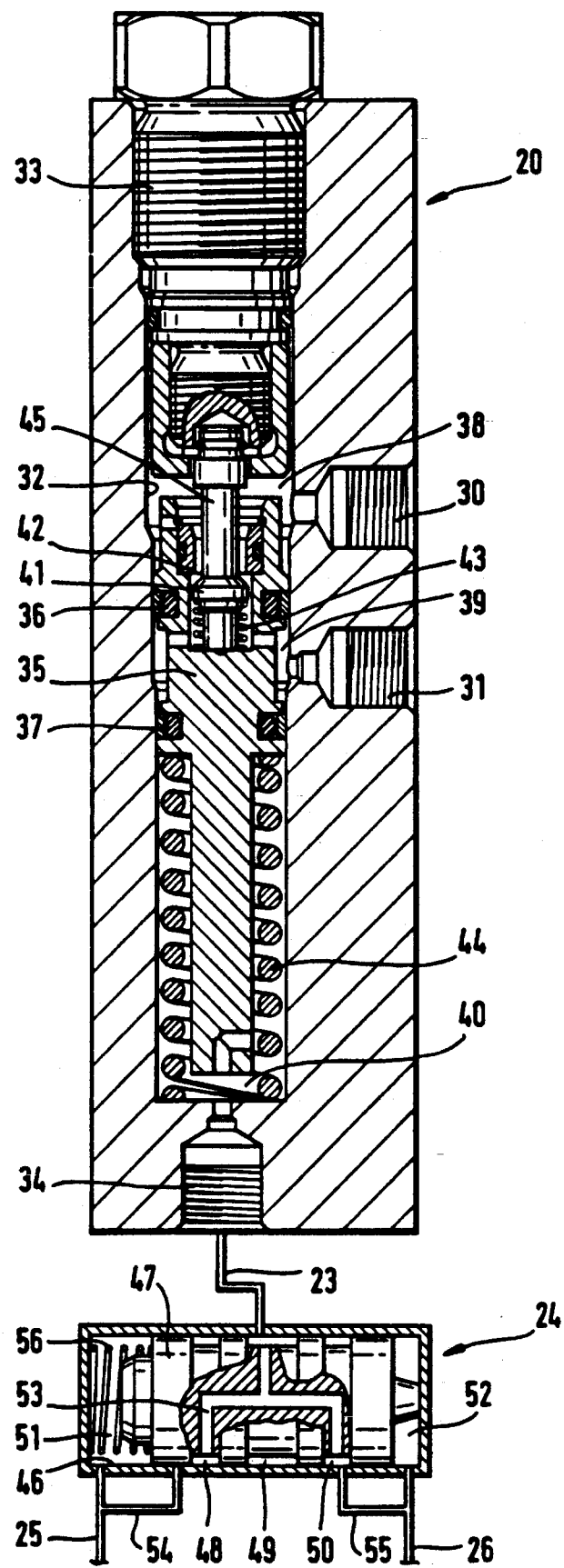
FIG. 2 is a differential pressure limiter with a pressure selector inserted ahead, as is used in the brake system of FIG. 1.

The differential pressure limiter 20, which is shown in detail in FIG. 2, is furnished with its control pressure by way of reference pressure line 23 which connects a control chamber of the differential pressure limiter 20 with the pressure selector 24. The control pressure supplied to the differential pressure limiter 20 corresponds to that pressure selected from one of the control lines 25 or 26 that lead from the wheel brakes 9 and 10, respectively, to the pressure selector 24.

Before the mode of function of the entire brake system is described, first the differential pressure limiter 20 with the pressure selector 24 shall be explained by way of FIG. 2.

The differential pressure limiter 20 connects with its inlet 30 to the pressure side of the pump, while its outlet 31 leads to the pressure accumulator 22. Inlet 30 and outlet 31 terminate into the stepped bore 32 which, at its end of large cross-section, is sealed by the plug 33 and, at its end of small cross-section, connects to the pressure fluid port 34. The reference pressure line 23 is connected to pressure fluid port 34. The likewise stepped piston 35 is axially slidably guided in the bore 32. At its large and at its small periphery, it is sealed relative to the bore wall by a rubber seal 36 and 37, respectively. The inlet chamber 38 is arranged at the piston end of large cross-section, and the control chamber 40 is disposed at the piston end of small cross-section, and in between is the outlet chamber 39. A valve 41/42 is arranged between inlet chamber 38 and outlet chamber 39 in the piston 35. The valve closure member 41 is acted upon by the valve spring 43 in the direction of the valve seat 42. However, since the compression spring 44 acts upon the piston 35 from the control chamber 40 in the opening direction, the valve closure member 41 with its tappet 45 is in abutment on the plug 33 and has lifted from the valve seat 42.

The pressure selector 24, which communicates with the control chamber 40 by way of the reference pressure line 23, comprises in a bore 46 a floating piston 47 which is provided with three annular grooves 48, 49 and 50. The annular chambers defined by the annular grooves 48, 49 and 50 are interconnected by way of ducts 53 which extend in the floating piston 47. The end chambers 51 and 52 disposed at the frontal ends of the floating piston are respectively connected to one of the control lines 25 and 26. Extending from these control lines 25 and 26 radially up to the bore 46 is each one control branch line 54 and 55, respectively. The axial distance of the ports of the two control branch lines 54 and 55 is dimensioned such that in each case only one of the two lines can be in communication with the control chamber 40 by way of one of the annular grooves 48 or 50 and the annular groove 49. In the illustrated embodiment the pressure selector acts as a minimal pressure selector. That means that it allows in each case the lower of the two pressures in the control lines to pass to the differential pressure limiter. The floating piston 47 is urged against an end wall by the weak compression spring 56. This compression spring defines, however, only a zero position of the piston, and its effects on the behavior of the pressure selector are negligible.

The minimal pressure selector 24 illustrated herein can be converted easily into a maximum pressure selector in that the distance of the ports of the control branch lines is somewhat reduced so that, in the position illustrated herein, the control branch line 54 ends into the annular groove 48, while the control branch line 55 is closed.

Figure 3:
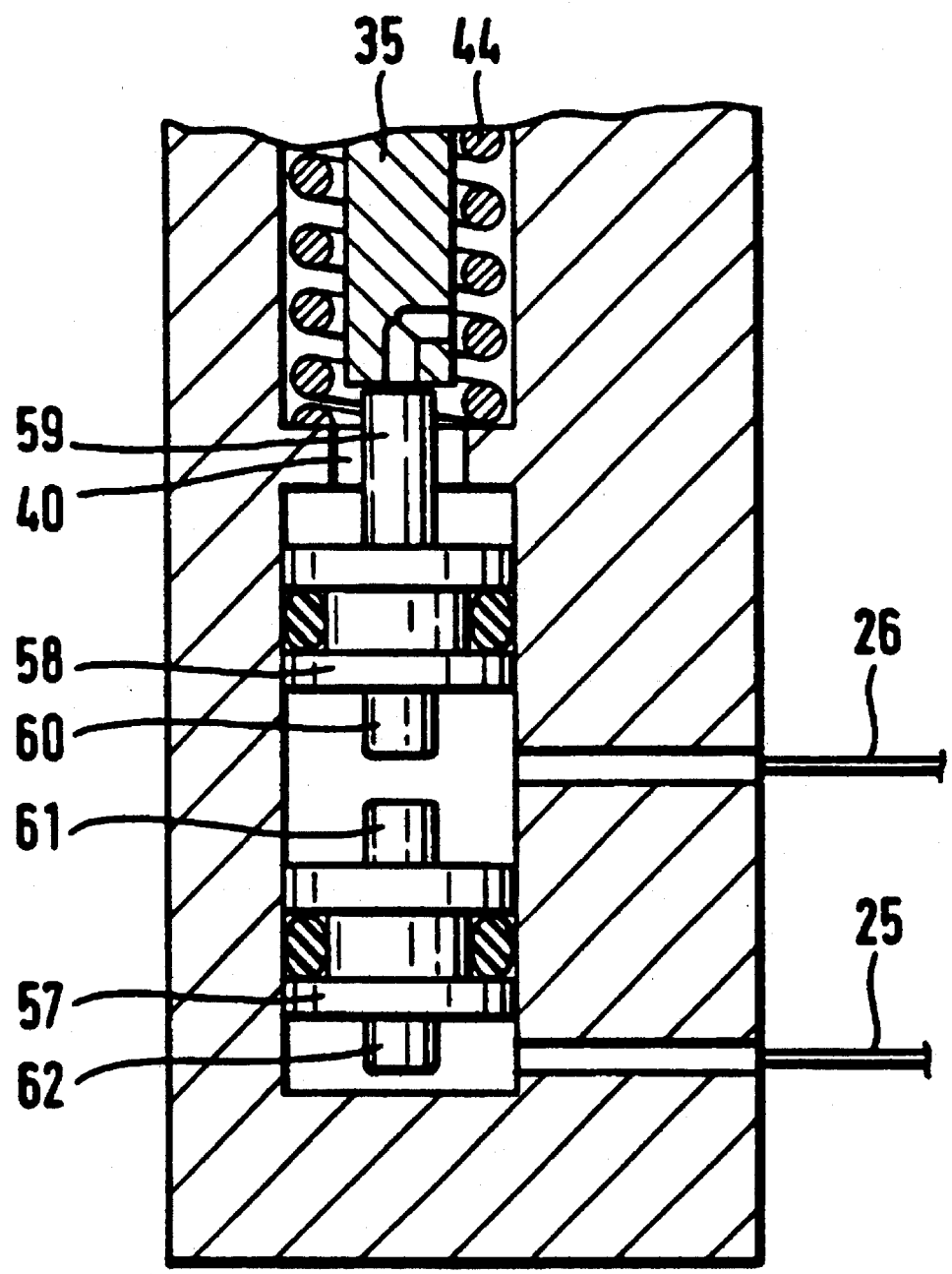
FIG. 3 is another second embodiment of the pressure selector of the present invention.

Another embodiment of a pressure selector is illustrated in FIG. 3. It operates as a maximum pressure selector and is arranged colinearly to the piston 35 of the differential pressure limiter. Essentially, it comprises two floating pistons 57 and 58 which are sealedly and axially slidably guided. They are each provided with axial spacer tappets 59 and 60 or, respectively, 61 and 62 so that they cannot move to abut entirely on a front wall or planely to each other. Once the pressure in the control line 25 is in excess of that in the control line 26, the floating piston 57 will press the floating piston 58 against the piston 35. The pressure in the control chamber 40 rises until it equals the pressure in the control line 25. In contrast thereto, the pressure in the control line 26 remains constant due to the spacer tappets 60 because no substantial volume decrease can occur. However, if the pressure in the control line 26 is in excess of that in the control line 25, the floating piston 57 is pressed against the bore end, and the floating piston 58 is pressed against the piston 35 as before.

The mode of function of the brake system in the normal braking operation and during an anti-lock control operation is known from the state of the art. The advantages of the present invention show in particular during a traction slip control operation when suddenly the wheel brakes 9 and 10 are to be filled by the pressure accumulator 22. Namely, in this event the full accumulator pressure will be applied to the inlet valves 7 and 8 without differential pressure limiter 20, while atmospheric pressure prevails downstream of the inlet valves. Yet with the differential pressure limiter 20, the following actions will take place:

The wheel brakes 9 and 10 are subject to atmospheric pressure. One of the two associated wheels has a locking tendency. The pressure selector 24 conveys atmospheric pressure to the control chamber 40 of the differential pressure limiter 20. The accumulator-charging valve 21 opens so that the full accumulator pressure prevails in the chambers 38 and 39. The valve 41/42 closes, since the piston 35 moves downwardly under the effect of the accumulator pressure. The compression spring 44 determines a closing pressure difference which, on the one hand, is sufficient for the traction slip control and, on the other hand, is small enough to appreciably diminish the switching noises of the inlet valves 7 and 8. Since the volume of the pressure accumulator 22 is rated such that it is sufficient for several control cycles, it will become necessary only very rarely to have pressure fluid replenished by the pump 17 during a traction slip control operation. Yet only in such a case would the switching noises of the inlet valves 7 and 8 become louder again, since no differential pressure limiter is interposed between pump and inlet valves. On the other hand, this could even be an advantage, since a permanent unstable condition is concerned, and the driver gets a feedback this way. Upon termination of the traction slip control operation, the pressure accumulator 22 is replenished by the pump 17, and the brake system is again ready for use for a noise-attenuated traction slip control operation.

We claim:

1. A slip-controlled hydraulic brake system, comprising:

at least two wheel brakes each said brake having an associated inlet valve, and an auxiliary-pressure source, wherein pressure fluid can be supplied from the auxiliary-pressure source to the wheel brakes by way of said inlet valves, a joint differential pressure limiter interposed between the auxiliary-pressure source and inlet valves, said differential pressure limiter permitting the pressure supplied from the auxiliary-pressure source to the inlet valves to exceed the pressure prevailing in the wheel brakes by a predetermined amount, said joint differential pressure limiter connected to at least two wheel brakes, a pressure selector connected to said joint differential pressure limiter, wherein each wheel brake includes one control line extending to said pressure selector which delivers one of the wheel braking pressures as a reference pressure to the differential pressure limiter.

2. A slip-controlled hydraulic brake system as claimed in claim 1, wherein the pressure selector is a piston-and-cylinder assembly which delivers in each case the lowest of the pressures prevailing in the control lines from each said wheel brake to the differential pressure limiter.

3. A slip-controlled hydraulic brake system as claimed in claim 1, wherein the pressure selector is a piston-and-cylinder assembly which delivers in each case the highest of the pressures prevailing in the control lines from each said wheel brake to the differential pressure limiter.

4. A slip-controlled hydraulic brake system as claimed in claim 1, wherein the auxiliary-pressure source is a pressure accumulator which is coupled to a pump through an accumulator line, wherein the differential pressure limiter is coupled to the accumulator line.

5. A slip-controlled hydraulic brake system as claimed in claim 1, wherein wherein the differential pressure limiter includes a bore having an axis and an axially slidable, stepped piston housed in said bore, said piston having a small peripheral end and a large peripheral end wherein said piston at its small and its large periphery, is respectively sealed within the bore, wherein said piston includes first and second spaced apart seals which define a control chamber at the piston end of small periphery, a first chamber at the piston end of large periphery and a second chamber between the first and second seals, a valve interposed between the first and the second chambers which closes when the piston moves towards the control chamber, and in that, in the valve's opening direction, the piston is acted upon by a compression spring arranged in the control chamber.

* * * * *